(12) United States Patent
Verma et al.

(10) Patent No.: US 8,349,284 B2
(45) Date of Patent: *Jan. 8, 2013

(54) SOL-GEL PROCESS FOR THE PREPARATION OF NANOCRYSTALLINE CETI2O6 POWDER

(75) Inventors: Amita Verma, New Delhi (IN); Suhasini Avinash Agnihotry, New Delhi (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

This patent is subject to a terminal disclaimer.

(21) Appl. No.: 12/294,617

(22) PCT Filed: Jan. 14, 2008

(86) PCT No.: PCT/IN2008/000020
§ 371 (c)(1),
(2), (4) Date: Jul. 28, 2009

(87) PCT Pub. No.: WO2008/099417
PCT Pub. Date: Aug. 21, 2008

(65) Prior Publication Data
US 2009/0311158 A1   Dec. 17, 2009

(30) Foreign Application Priority Data
Feb. 13, 2007   (IN) .............................. 279/DEL/2007

(51) Int. Cl.
*C01F 17/00* (2006.01)
(52) U.S. Cl. ..................................................... 423/263
(58) Field of Classification Search ........................ None
See application file for complete search history.

(56) References Cited

U.S. PATENT DOCUMENTS
7,678,413 B2 * 3/2010 Amita et al. ............... 427/126.2
2005/0191492 A1   9/2005 Yadav

OTHER PUBLICATIONS

Verma et al(Sol-gel derived nanocrystalline CeO2-TiO2 coatings for electrochromic windows, Solar Energy Materials and Solar Cells. 86(2005) pp. 85-103.).*
Cernea et al(Sol-gel synthesis and characterization of Ce doped-BaTiO3, J. Euro Ceram Soc 26(2006) 3241-3246).*
Kuo et al(Structural evolution during calcination of sol-gel synthesized alumina and alumina-8 vol% zirconia composite, Journal of Materials Science 32(1997) 2687-2692).*
Linshen, C. et al, "Mid-Temperature Synthesis of $CeO_2$-$TiO_2$ Complex Compound and Its XRD Structure Study," *Journal of Rare Earths*, Apr. 1, 2003, pp. 108-111, vol. 21, No. 2, International Academeic Publishers, Beijing, China.
Otsuka-Yao-Matsuo, S. at al., "Photocatalytic Behavior of Cerium Titanates, $CeTiO_4$ and $CeTi_2O_6$ and Their Composite Powders with $SrTiO_3$," *Journal of Alloys and Compounds*, Aug. 11, 2004, pp. 262-267, vol. 376, No. 1-2, Elsevier Sequoia, Lausanne, China.
Verma, A. et al., "Variations in the Structural, Optical and Electrochemical Properties of $CeO_2$-$TiO_2$ Films as a Function of $TiO_2$ Content" *Applied Surface Science*, May 15, 2006 (online Sep. 15, 2005), pp. 5131-5142, vol. 252, No. 14, Elsevier, Amsterdam, Netherlands.
International Search Report in connection with International Application No. PCT/IN2008/000020 dated May 13, 2008.

* cited by examiner

*Primary Examiner* — Emily Le
*Assistant Examiner* — Michael Forrest
(74) *Attorney, Agent, or Firm* — DLA Piper LLP (US)

(57) ABSTRACT

The present invention provides an improved sol-gel process for the preparation of nanocrystalline $CeTi_2O_6$ compound, which has applications in the area of photocatalytic activity. This compound can be obtained by completely drying the solution, which comprises both titanium and cerium precursors into a xerogel and sintering it at a temperature of 1400° C. for 5 min. in air. The Ce:Ti mole ratio in the precursor sol for the preparation of this compound is identified in the range of 0.33:1 and 0.6:1.

5 Claims, 4 Drawing Sheets

SOL-GEL PROCESS FOR THE PREPARATION OF NANOCRYSTALLINE CETI2O6 POWDER

CROSS REFERENCE TO RELATED APPLICATIONS

This application is a 35 USC §371 National Stage application of International Application No. PCT/IN2008/000020 filed Jan. 14, 2008, now pending; which claims the benefit under 35 USC §119(a) to India Patent Application No. 279/DEL/2007 filed Feb. 13, 2007. The disclosure of each of the prior applications is considered part of and is incorporated by reference in the disclosure of this application.

FIELD OF THE INVENTION

The present invention relates to an improved sol-gel process for the preparation of nanocrystalline $CeTi_2O_6$ powder. Particularly, the present invention provides an improved process for the preparation of highly chemically stable nanocrystalline $CeTi_2O_6$ state.

BACKGROUND OF THE INVENTION

In the developmental process of $WO_3$ based transmissive ECDs, we are concentrating our efforts for developing ion storage counter electrode films with a high transmittance for visible light both in the charged and discharged state and an ion storage capacity exceeding 20 mCcm$^{-2}$ or comparable to $WO_3$ to provide sufficient number of ions for deep colouration. Therefore, work has been undertaken in this direction for the synthesis of $CeO_2$ precursors doped with $TiO_2$ via a wet chemistry route.

The widely used sol-gel process offers numerous advantages over the other conventional deposition techniques, which include tailor making of the film's properties, introduction of porosity in the films, low process cost and possible processing at low temperature. Preparation of $CeO_2$ based films by sol-gel technique has been attempted following various routes. The use of alkoxides, the most popular precursor material in sol-gel processing has been reported by D. Keomany, C. Poinsignon, D. Deroo. in *Sol. Energy Mater. Sol. Cells* 33 (1994) 429-441. Alternately salts of cerium, like $CeCl_3.7H_2O$, $[(NH_4)_2\{Ce(NO_3)_6\}]$ in combination with Ti alkoxides have been shown by A. Makishima, M. Asami and K. Wada, in *J. Non-Cryst Solids* 121 (1990) 310-314 as one of the routes to get $CeO_2$—$TiO_2$ films. Based on the earlier reports on these materials, A. Makishima, M. Asami and K. Wada, in *J. Non-Cryst. Solids* 121 (1990) 310-314 have performed a study in which the type of alkoxyl group of titanium alkoxide and the kind of catalyst have been varied in order to study their influence on the properties of the films. The films deposited by the authors have been sintered at 500° C. and the XRD patterns of these films are characterized by the appearance of diffraction peaks of the $CeO_2$ phase alone. In our earlier invention, we have reported the preparation of $CeTi_2O_6$ compound in thin film form using a sol-gel process employing the same precursor materials as in the present invention. $CeTi_2O_6$ thin films have the potential to be used as passive counter electrodes in electrochromic devices.

In the sol-gel process, using alkoxide compounds, hydrolysis and condensation reactions are crucial for obtaining a gel. Through hydroxylation-condensation reactions, oxopolymers from transition metal alkoxides (TMA) can be grown into an oxide network as has been reported by D. C. Bradley, R. C. Mehrotra and D. P. Gaur in *Metal Alkoxides* (Academic Press, New York, 1978). The normal course of the reaction for transition metal alkoxides dissolved in a solvent leads to precipitation of the polymers. Control of the reactivity of TMA is necessary in order to obtain sols and gels. In titanium-based systems, this control is achieved through the addition of complexing agents and salts such as ceric ammonium nitrate and cerium chloride.

Photocatalytic reaction sensitized by $TiO_2$ and other semiconducting materials has attracted extensive interest as a potential way of solving energy and environmental issues. Several cerium titanates have been investigated for photocatalytic activity. Yellow colored cerium titanate, $CeTi_2O_6$ with mainly $Ce^{4+}$ state is known to cause photobleaching of methylene blue aqueous solution with irradiation of Xe discharge light as reported by S. O-Y-Matsuo, T. Omata, M. Yoshimura in *J. Alloys and Compounds,* 376 (2004) 262-267. Mixed $CeO_2$—$TiO_2$ films are reported by Q. N. Zhao, C. L. Li, X. J. Zhao in *Key Engineering Materials* 249 (2003) 451-456 to decolorize methyl orange solutions upon irradiation of the UV light.

Brannerite, $UTi_2O_6$ is an accessory phase in the titanate-based crystalline ceramics of synroc as reported by A. E. Ringwood, S. E. Kession, N. G. Ware, W. Hibberson, A. Major in *Nature (London)* 278 (1979) 219. The ideal formula of natural brannerite is $(U,Th)_{1-x}Ti_{2+x}O_6$ with a uranium deficiency and excess titanium. Possible cation substitutions identified in natural brannerite for uranium are Pb, Ca, Th, Y, Ce and for titanium are Si, Al, Fe. Stoichiometric brannerite is monoclinic with space group C2/m. There are two different distorted octahedra in $CeTi_2O_6$ structure. Distorted $TiO_6$ octahedra form a zigzag sheet by sharing common edges, and each Ti octahedron shares three edges with titanium octahedra and three corners with cerium octahedra. The sheets of $TiO_6$ octahedra are identical with those of the anatase structure parallel to (101) plane. The Ce cations located at the interlayer sites connect adjacent sheets. Each cerium octahedron shares two common edges with neighboring cerium octahedra and four corners with $TiO_6$ octahedra. As has been reported by K. B. Helean, A. Navrotsky, G. R. Lumpkin, M. Colella, J. Lian, R. C. Ewing, B. Ebbinghaus and J. G. Catalano in *J. Nucl. Mater.* 320 (2003) 231-244, $CeTi_2O_6$ in the powdered form can be prepared by sintering in air (at 1350° C. for >100 h) a pellet containing stoichiometric portions of the oxides, $CeO_2$ and $TiO_2$. The preparation of $CeTi_2O_6$ solid solution using cerous nitrate and titanium tetrachloride precursors has been reported by Y. Chen, X. Jiang and L. Lou in CN1565724. As reported by Chen Linchen, Lu Guanglie, and Hu Xiurong in *J. Rare Earths,* 21 (2003) 108-111, the formation of $CeTi_2O_6$ powder using the sol-gel process is possible using precursor materials, $Ce(NO_3)_3.6H_2O$, $Ti(OBu)_4$ in anhydrous ethanol. The present invention reports the synthesis of $CeTi_2O_6$ compound from different precursors i.e. cerium chloride heptahydrate and titanium propoxide.

In the present invention, the $CeTi_2O_6$ phase has been achieved in powdered form by the sol-gel technique, which represents a reliable, low-cost chemical route. In comparison to the powdered $CeTi_2O_6$ material, which is formed by other research groups by ball milling stoichiometric portions of $CeO_2$ and $TiO_2$, the same material in the present invention is prepared by a simple sol-gel process wherein homogeneous solutions containing different precursors can be prepared at relative ease and greater precision. $CeTi_2O_6$ compound has the potential for use as a photocatalytic agent. The $CeTi_2O_6$ compound in the present invention has shown superior response as a photocatalyst in comparison to $TiO_2$ powder, which is the best known photocatalytic agent as per the literature reports. Using cerium chloride heptahydrate and titanium propoxide precursors, we have reported earlier in *Sol. Ener. Mater. Sol. Cells* 86 (2005) 85-103, the formation of a mixed compound of $CeO_2$ and $TiO_2$ i.e. $CeO_{1.6}.2TiO_2$ in thin films at annealing temperature of 500° C. from the Ce:Ti compositions, 4:1 and 2:1.

OBJECTS OF THE INVENTION

The main object of the present invention is to provide an improved sol-gel process for the preparation of nanocrystalline $CeTi_2O_6$ powder.

Another object of the present invention is to have a process, which will result in $CeTi_2O_6$ powder with high chemical durability.

Yet another object of the present invention is to prepare nanocrystalline $CeTi_2O_6$ phase in the powder form.

Yet another object of the present invention is to prepare powdered $CeTi_2O_6$ compound from different Ce/Ti compositions in the sol.

Still another object of the present invention is to use a process, which involves a very few number of simple steps.

SUMMARY OF THE INVENTION

Figure 1:
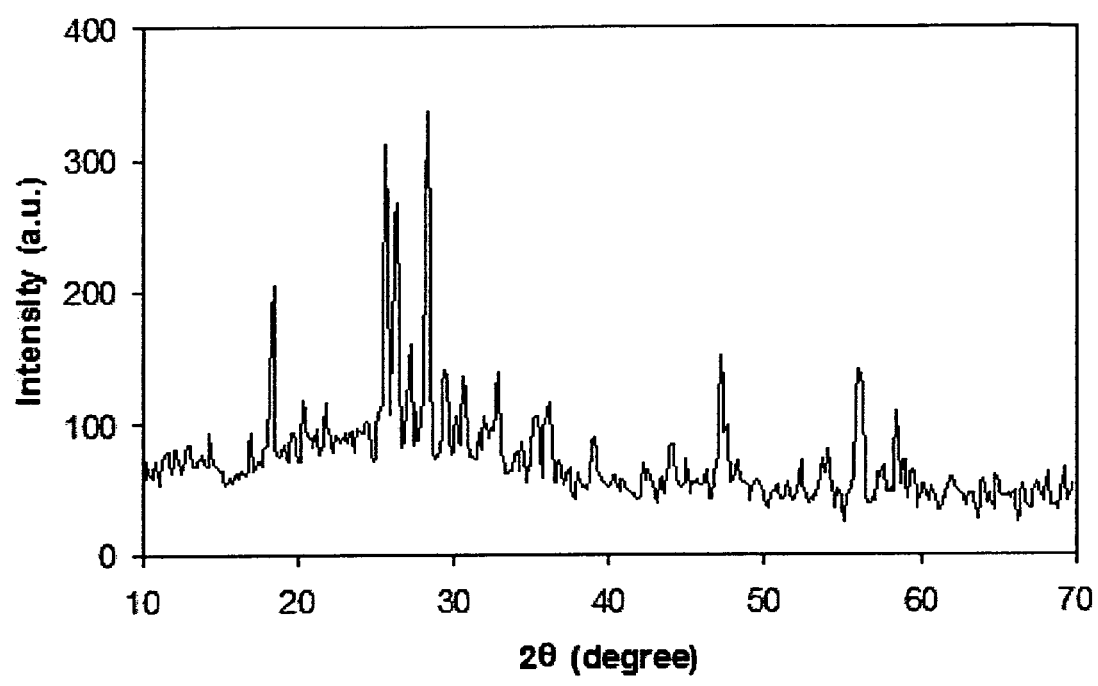
FIG. 1 represents the XRD pattern of the $CeTi_2O_6$ compound.

Accordingly the present invention provides an improved sol-gel process for the preparation of nanocrystalline $CeTi_2O_6$ powder, the said process comprising the steps of:
(a) preparing an ethanolic solution of about 0.20-0.30 M cerium chloride heptahydrate,
(b) adding the above said solution obtained in step (a) to titanium propoxide to obtain a reaction mixture having concentration of titanium propoxide in the range of 0.331-0.860 M and a mole ratio of Ce to Ti in the range of 0.33:1 to 0.6:1 and stirring it for a period of 4-10 min, followed by aging at a temperature of 20-30° C., for a period of about one week to obtain the xerogel,
c) sintering the above said xerogel obtained in step (b) in air at a temperature in the range of 1390-1410° C., for a period of 2-10 min. to obtain the desired product.

In an embodiment of the present invention the strength of the cerium chloride heptahydrate solution is 0.20-0.25 M.

In yet another embodiment the concentration of titanium propoxide in solution used in step (b) is in the range of 0.338-0.860 M.

In yet another embodiment the sintering temperature used in step (c) is in the range of 1395-1405° C.

In yet another embodiment the time period used for sintering in step (c) is in the range of 3-5 min.

In comparison to the powdered $CeTi_2O_6$ material, which is prepared by other research groups by ball milling stoichiometric portions of $CeO_2$ and $TiO_2$ and pressing the mixture into a pellet followed by sintering, the same material in the present invention is prepared by a simple sol-gel process wherein homogeneous Ce/Ti solutions containing Ce and Ti in desirable mole ratios can be prepared at greater ease. Novelty of the present invention lies in the use of a sol-gel process for the preparation of highly chemically stable nanocrystalline $CeTi_2O_6$ by using precursor materials, which are different from the one reported in the literature.

DETAILED DESCRIPTION OF THE INVENTION

The initial clear, colorless solution of cerium chloride heptahydrate is prepared by stirring the cerium salt in absolute ethanol until the salt dissolves completely. The solution is prepared at ambient temperature. Ti alkoxides readily hydrolyze in aqueous and alcoholic solutions. The addition of cerium based alcoholic solution to titanium propoxide such that Ce:Ti mole ratio is between 0.33:1 and 0.6:1 does not induce precipitation into the titanium propoxide. The cerium salt stabilizes the alkoxide solution and prevents the precipitation of the hydroxides. The gelation time of the solution varies depending on the content of Ti alkoxide in the solution. The gelation time for Ce:Ti mole ratio (0.6:1, 0.5:1, 0.4:1 and 0.33:1) solutions is approximately one week depending on the ambient temperature and humidity conditions.

The sols after aging and complete drying have been thermally treated at 1400° C. for 5 min. in air at the heating rate of 1-2° C. $min^{-1}$.

Ce:Ti (0.6:1, 0.5:1, 0.4:1 and 0.33:1) solutions based on cerium chloride heptahydrate and titanium propoxide have been prepared by dissolving the alkoxide in 0.22 M cerium chloride solution.

The following examples illustrate the preparation of sol preferred for the preparation of $CeTi_2O_6$ powder and should not be construed to limit the scope of the present invention.

EXAMPLE 1

Figure 2:
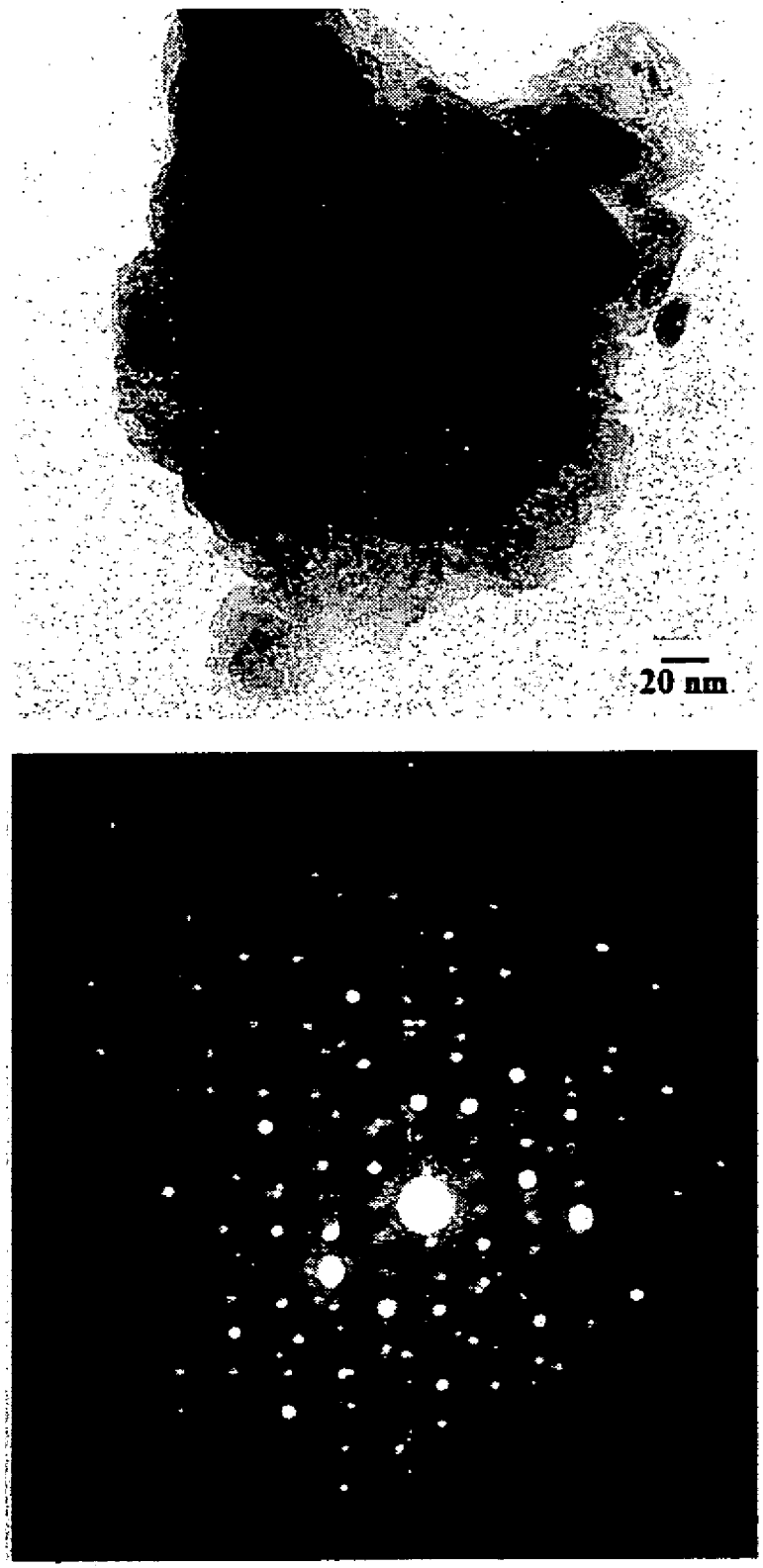
FIG. 2 represents the bright field micrograph and electron diffraction pattern of the $CeTi_2O_6$ compound.

0.22 M solution of cerium chloride heptahydrate ($CeCl_3.7H_2O$, Merck) has been prepared in absolute ethanol ($C_2H_5OH$, Merck). The above clear, colorless solution has been added to titanium propoxide such that the Ce:Ti mole ratio in the solution is 0.5:1. The resultant bright yellow solution has been stirred for 5 min. After allowing the commencement of gelation in the resultant yellow solution, the sol has been kept in ambient conditions in a closed glass vessel to allow complete drying of the gel in order to yield a xerogel. Subsequently, the xerogel has been thermally treated at 1400° C. for 5 min. in air at a heating rate of 1-2° C. $min^{-1}$. The XRD results (FIG. 1) have shown the formation of monoclinic $CeTi_2O_6$ phase in the powder form with an average crystallite size of 24.2 nm. The TEM images of the same compound are shown in FIG. 2.

EXAMPLE 2

0.22 M solution of cerium chloride heptahydrate ($CeCl_3.7H_2O$, Merck) has been prepared in absolute ethanol ($C_2H_5OH$, Merck). The above clear, colorless solution has been added to titanium propoxide such that the Ce:Ti mole ratio in the solution is 0.6:1. The resultant bright yellow solution has been stirred for 5 min. After allowing the commencement of gelation in the resultant yellow solution, the sol has been kept in ambient conditions in a closed glass vessel to allow complete drying of the gel in order to yield a xerogel. Subsequently, the xerogel has been thermally treated at 1400° C. for 5 min. in air at a heating rate of 1-2° C. $min^{-1}$.

The XRD results have shown the formation of monoclinic $CeTi_2O_6$ phase in the powder form with an average crystallite size of 18.1 nm.

EXAMPLE 3

Figure 3:
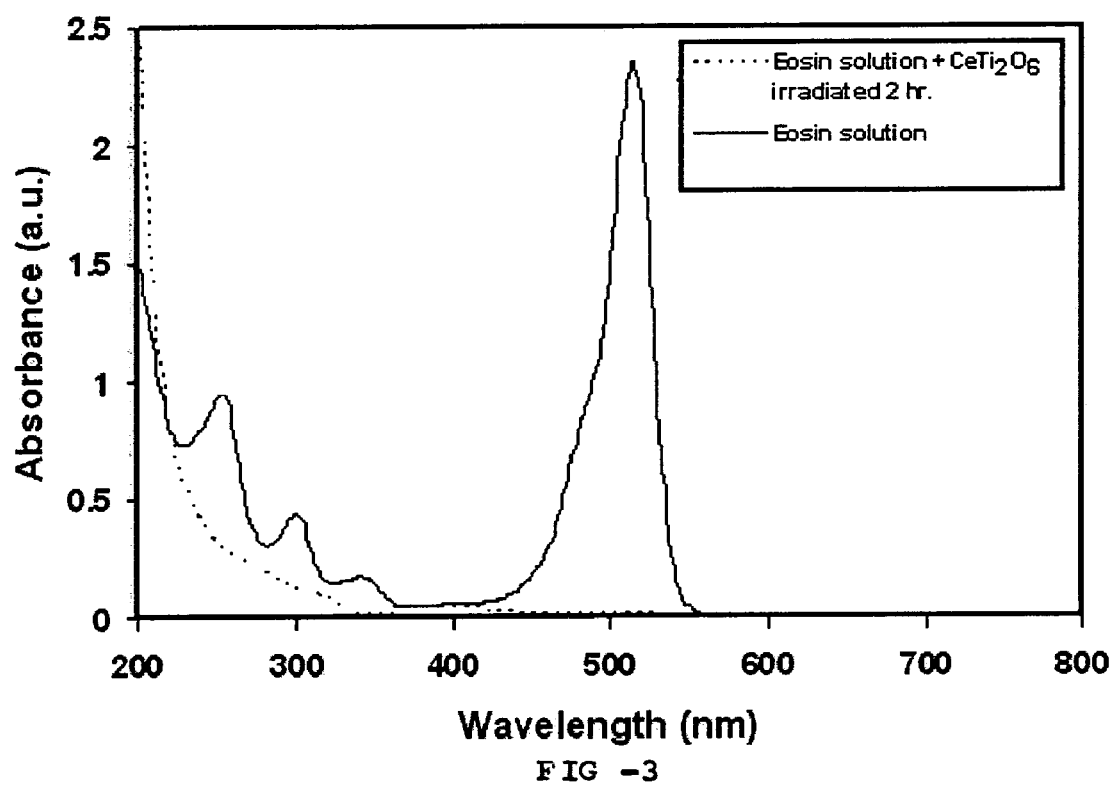
FIG. 3 represents the absorbance spectra of as-prepared eosin solution without the $CeTi_2O_6$ compound and in the presence of $CeTi_2O_6$ compound upon UV-Visible light irradiation for 2 hrs.
Figure 4:
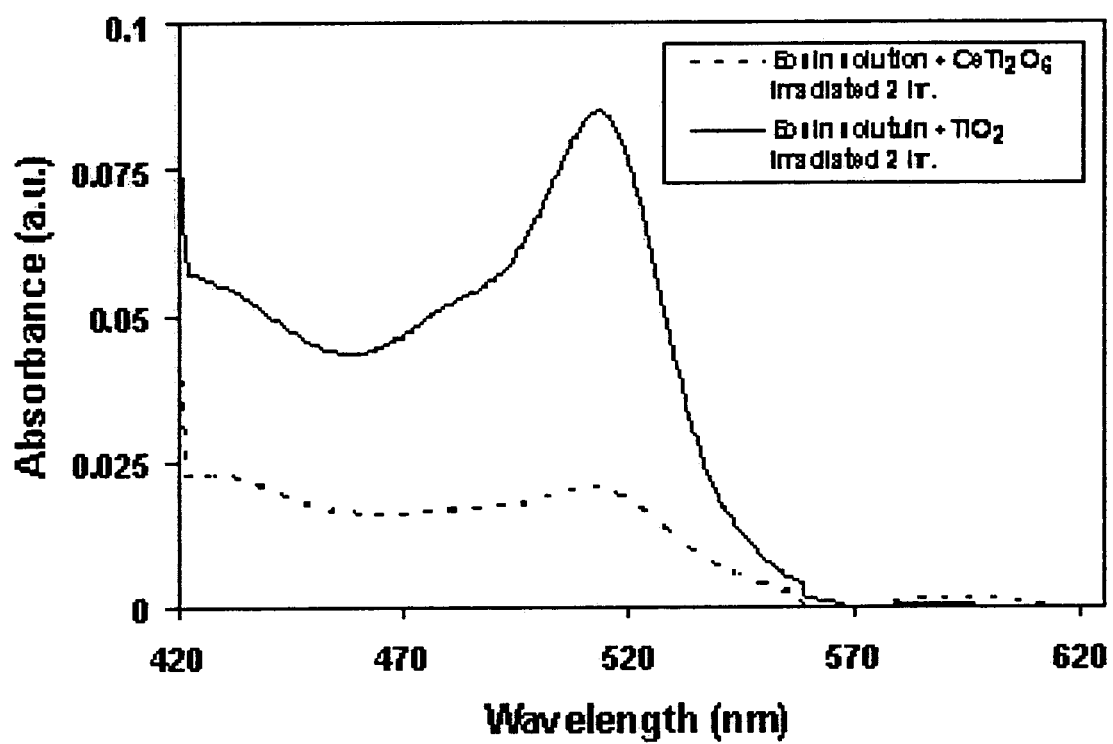
FIG. 4 represents the absorption spectra of eosin solution in the presence of $CeTi_2O_6$ and $TiO_2$ powder after UV-Visible light irradiation for 2 hrs.

0.22 M solution of cerium chloride heptahydrate ($CeCl_3.7H_2O$, Merck) has been prepared in absolute ethanol ($C_2H_5OH$, Merck). The above clear, colorless solution has been added to titanium propoxide such that the Ce:Ti mole ratio in the solution is 0.4:1. The resultant bright yellow solution has been stirred for 5 min. After allowing the commencement of gelation in the resultant yellow solution, the sol has been kept in ambient conditions in a closed glass vessel to allow complete drying of the gel in order to yield a xerogel. Subsequently, the xerogel has been thermally treated at 1400° C. for 5 min. in air at a heating rate of 1-2° C. $min^{-1}$. The XRD results have shown the formation of monoclinic $CeTi_2O_6$ phase in the powder form with an average crystallite size of 28.2 nm. FIG. 3 shows the absorption spectra of eosin (yellow shade) solution in the as-prepared state and upon irradiation by 80 W mercury vapor lamp for 2 hrs. in the presence of $CeTi_2O_6$ compound. FIG. 4 provides the absorption spectra of eosin solution irradiated in the presence of $CeTi_2O_6$ and $TiO_2$ powders for 2 hrs.

EXAMPLE 4

0.22 M solution of cerium chloride heptahydrate ($CeCl_3.7H_2O$, Merck) has been prepared in absolute ethanol ($C_2H_5OH$, Merck). The above clear, colorless solution has been added to titanium propoxide such that the Ce:Ti mole ratio in the solution is 0.33:1. The resultant bright yellow solution has been stirred for 5 min. After allowing the commencement of gelation in the resultant yellow solution, the sol has been kept in ambient conditions in a closed glass vessel to allow complete drying of the gel in order to yield a xerogel. Subsequently, the xerogel has been thermally treated at 1400° C. for 5 min. in air at a heating rate of 1-2° C. $min^{-1}$. The XRD results have shown the formation of monoclinic $CeTi_2O_6$ phase in the powder form with an average crystallite size of 16.5 nm.

Table I shows the comparison of $CeTi_2O_6$ crystallite size obtained from different Ce:Ti mole ratios.

TABLE I

| Crystallite size of $CeTi_2O_6$ phase obtained from different Ce:Ti mole ratios. | |
| --- | --- |
| Ce:Ti mole ratio | Crystallite size (nm) |
| 0.33:1 | 16.5 |
| 0.4:1 | 28.2 |
| 0.5:1 | 24.2 |
| 0.6:1 | 18.1 |

The main advantages of the present invention are:
1. In comparison to the powdered $CeTi_2O_6$ material, which is prepared by other research groups by ball milling stoichiometric portions of $CeO_2$ and $TiO_2$ and pressing that mixture into a pellet followed by sintering, the same material in the present invention is prepared by a simple sol-gel process wherein homogeneous Ce/Ti solutions containing desirable Ce/Ti mole ratios can be prepared at relative ease with greater precision. These results further confirm the advantages of the sol-gel process over other conventional techniques, since the precision in mixing of different components is possible in this process even at the atomic level.
2. The above said difficult process of mixing $CeO_2$ and $TiO_2$ solid precursors for the formation of $CeTi_2O_6$ compound has been replaced in the present invention by a simplified sol-gel process. It is evident that the mixing of different precursors in a solution phase is much simpler than the assimilation in a solid phase.
3. In the present invention, four simplified steps are only required for the preparation of $CeTi_2O_6$ compound.
4. The preparation of sol used for the formation of $CeTi_2O_6$ compound takes very less time.
5. Methodology followed in the present invention does not require expensive instruments.
6. In the present invention, the sintering temperature duration for the preparation of $CeTi_2O_6$ compound is 5 min. only. Importantly, the duration of the heat treatment reported earlier for the formation of this compound is 100 h.
7. This compound finds application in area of photocatalytic activity.
8. In comparison to $TiO_2$ powder, the $CeTi_2O_6$ compound prepared in the present invention has decolorized the eosin (yellow shade) solution at a faster rate.

We claim:

1. An improved sol-gel process for the preparation of nanocrystalline CeTi2O6 powder, the process comprising the steps of:
    a) preparing an ethanolic solution of about 0.20-0.30 M cerium chloride heptahydrate;
    b) adding the solution obtained in step (a) to titanium propoxide to obtain a reaction mixture having concentration of titanium propoxide in the range of 0.331-0.860 M and a mole ratio of Ce to Ti in the range of 0.33:1 to 0.6:1;
    c) stirring the reaction mixture obtained in step (b) for a period of 4-10 minutes;
    d) aging the stirred reaction mixture obtained in step (c) at a temperature of 20-30° C., for a period of about one week to obtain a xerogel, and
    e) sintering the xerogel obtained in step (d) in air at a temperature in the range of 1390-1410° C., for a period of 0.2-10 minutes to obtain the nanocrystalline CeTi2O6 powder.

2. The process of claim 1, wherein the strength of the cerium chloride heptahydrate solution is in the range of 0.20-0.25 M.

3. The process of claim 1, wherein the concentration of titanium propoxide in solution in step (b) is in the range of 0.338-0.860 M.

4. The process of claim 1, wherein the sintering temperature in step (e) is in the range of 1395-1405° C.

5. The process of claim 1, wherein the time period for sintering in step (e) is in the range of 3-5 minutes.

* * * * *